(12) United States Patent
Yasui et al.

(10) Patent No.: US 9,077,015 B2
(45) Date of Patent: Jul. 7, 2015

(54) BATTERY PACK

(75) Inventors: Shunsuke Yasui, Osaka (JP); Toshihiko Kurosaki, Hyogo (JP); Toshiki Itoi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 435 days.

(21) Appl. No.: 13/378,863

(22) PCT Filed: Nov. 11, 2010

(86) PCT No.: PCT/JP2010/006627
§ 371 (c)(1),
(2), (4) Date: Dec. 16, 2011

(87) PCT Pub. No.: WO2011/104792
PCT Pub. Date: Sep. 1, 2011

(65) Prior Publication Data
US 2012/0100401 A1 Apr. 26, 2012

(30) Foreign Application Priority Data
Feb. 24, 2010 (JP) .................... 2010-038655

(51) Int. Cl.
*H01M 2/12* (2006.01)
*H01M 10/52* (2006.01)
(Continued)

(52) U.S. Cl.
CPC ............ *H01M 2/105* (2013.01); *H01M 2/1077* (2013.01); *H01M 2/1229* (2013.01);
(Continued)

(58) Field of Classification Search
CPC ............ H01M 10/0431; H01M 2/022; H01M 2/0245; H01M 2/12
USPC .................. 429/72, 164, 82, 163, 87
See application file for complete search history.

(56) References Cited

U.S. PATENT DOCUMENTS 6,465,986 B1    10/2002  Haba
2005/0285567 A1*  12/2005  Kim .............................. 320/116
(Continued)

FOREIGN PATENT DOCUMENTS

JP    11-273647        10/1999
JP    2002-008603   *   1/2002  .............. H01M 2/10
(Continued)

OTHER PUBLICATIONS

International Search Report issued in International Patent Application No. PCT/JP2010/006627 dated Feb. 22, 2011.
(Continued)

*Primary Examiner* — Barbara Gilliam
*Assistant Examiner* — Angela Martin
(74) *Attorney, Agent, or Firm* — McDermott Will & Emery LLP

(57) ABSTRACT

A battery pack includes a plurality of battery modules including a plurality of cells 100 aligned and accommodated in a case, wherein a battery assembly 200 in which the plurality of cells 100 are aligned in a row is used as a unit, and the multiple ones of the battery assembly 200 are aligned in each battery module. The battery modules are a first battery module 300 in which the plurality of battery assemblies 200 are aligned in parallel and second battery modules 400A, 400B in which the plurality of battery assemblies 200 are aligned in series, and the first battery module 300 and the second battery modules 400A, 400B are combined with each other to form the battery pack.

9 Claims, 11 Drawing Sheets

(51) Int. Cl.
- *H01M 2/10* (2006.01)
- *H01M 2/20* (2006.01)
- *H01M 6/42* (2006.01)
- *H01M 10/42* (2006.01)

(52) U.S. Cl.
CPC ............ *H01M2/1252* (2013.01); *H01M 2/202* (2013.01); *H01M 6/42* (2013.01); *H01M 2010/4271* (2013.01)

(56) References Cited

U.S. PATENT DOCUMENTS

| | | | |
|---|---|---|---|
| 2009/0181288 A1 | 7/2009 | Sato | |
| 2009/0233165 A1 | 9/2009 | Carlson et al. | |
| 2009/0297892 A1* | 12/2009 | Ijaz et al. | 429/7 |
| 2010/0047673 A1* | 2/2010 | Hirakawa et al. | 429/54 |
| 2010/0062329 A1* | 3/2010 | Muis | 429/158 |
| 2011/0195284 A1 | 8/2011 | Yasui et al. | |

FOREIGN PATENT DOCUMENTS

| | | | | |
|---|---|---|---|---|
| JP | 2002-533042 | | 10/2002 | |
| JP | 2003-100267 | * | 4/2003 | ............. H01M 2/10 |
| JP | 2003-284251 | | 10/2003 | |
| JP | 2004-39582 | * | 2/2004 | ............. H01M 2/12 |
| JP | 2004-265830 A | | 9/2004 | |
| JP | 2008-117756 | * | 5/2008 | ............. H01M 2/10 |
| JP | 2009-240094 | * | 10/2009 | ............. B60L 11/18 |
| WO | WO 2008/109764 | * | 9/2008 | ............. H01M 10/50 |

OTHER PUBLICATIONS

Extended European Search Report issued in European Application No. 10846460.3 mailed May 26, 2014.

* cited by examiner

FIG.2
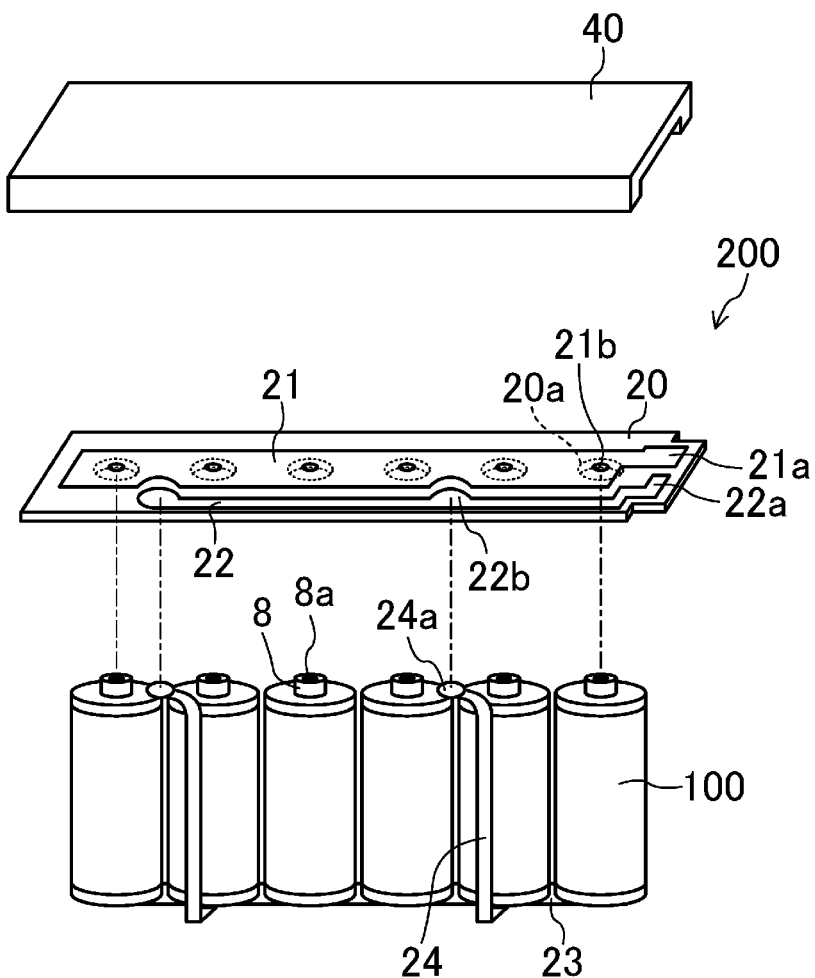

FIG.3
(a)
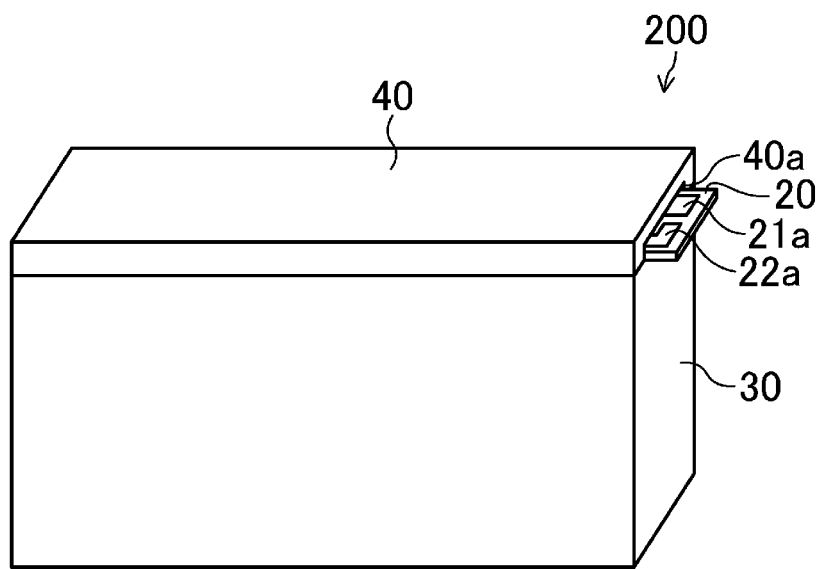
(b)
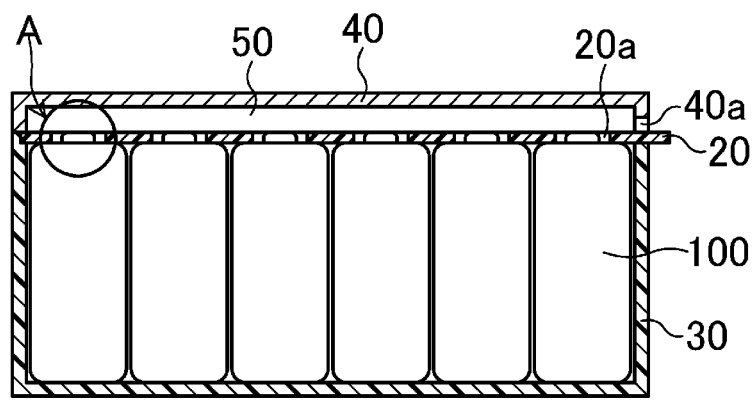
(c)
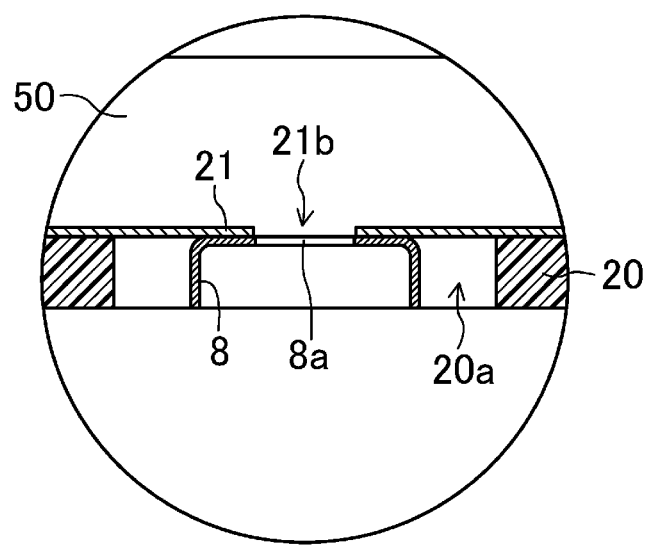

FIG.4
(a) 
(b) 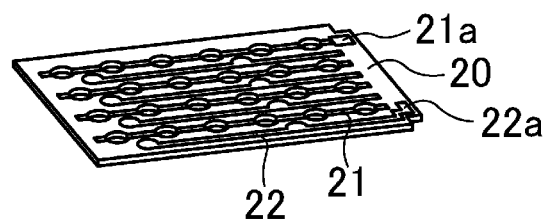
(c) 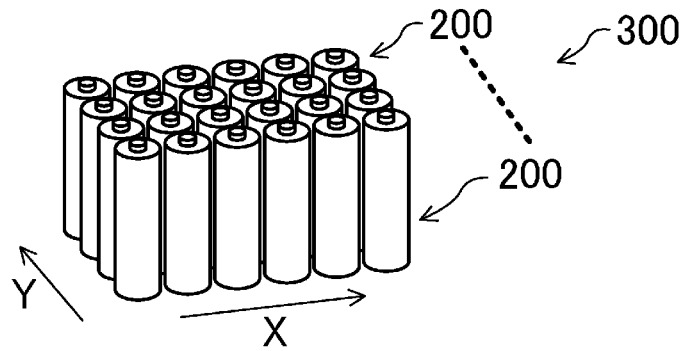
(d) 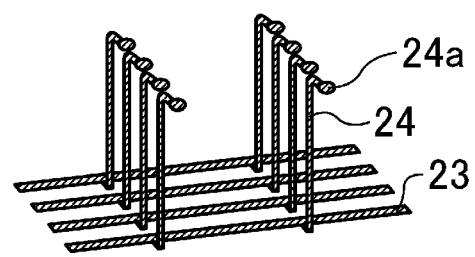
(e) 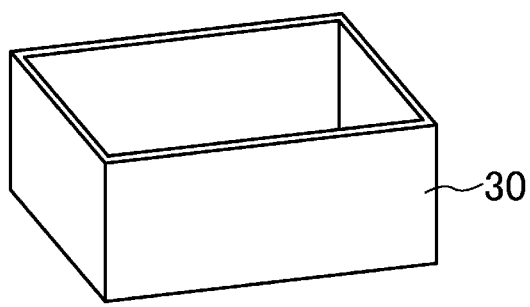

FIG.8
(a) 
(b) 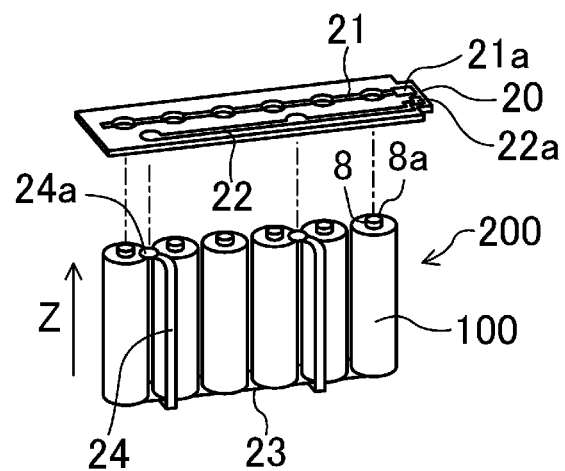
(c) 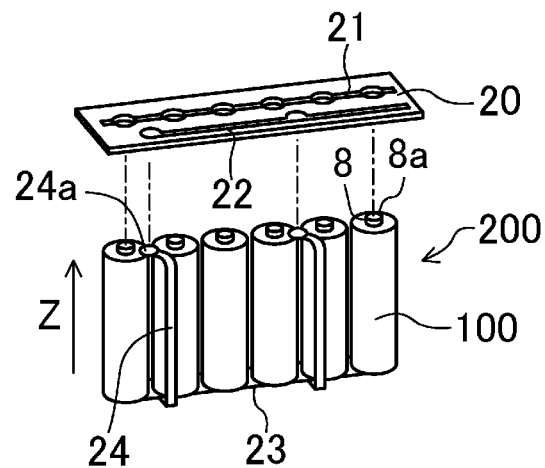
(d) 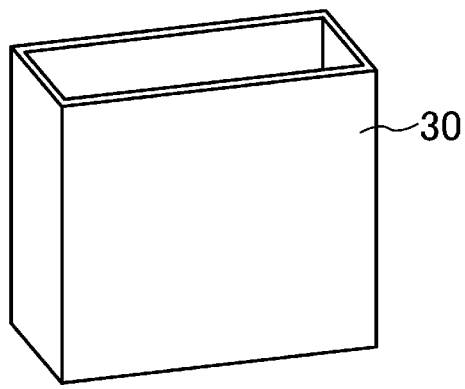

FIG.11
(a)
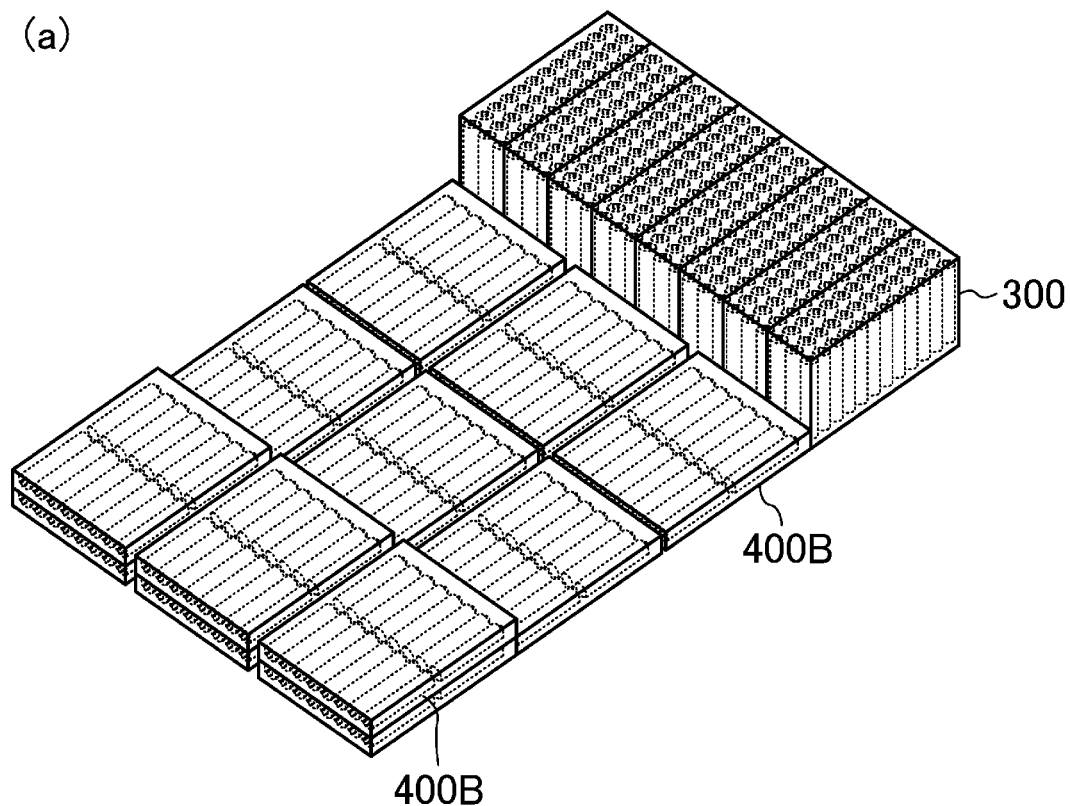
(b)
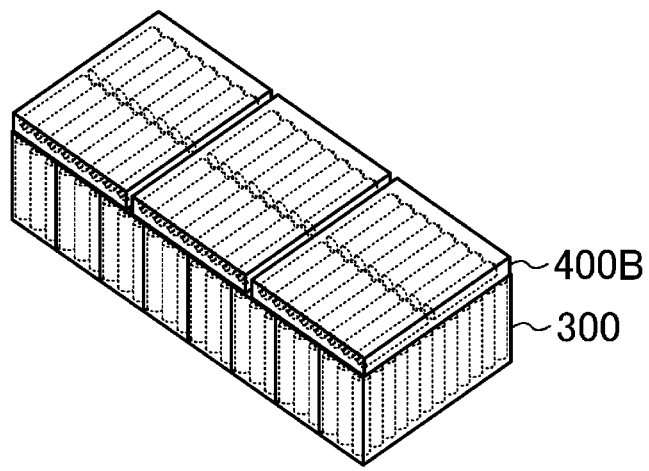

BATTERY PACK

RELATED APPLICATIONS

This application is the U.S. National Phase under 35 U.S.C. §371 of International Application No. PCT/JP2010/006627, filed on Nov. 11, 2010, which in turn claims the benefit of Japanese Application No. 2010-038655, filed on Feb. 24, 2010, the disclosures of which Applications are incorporated by reference herein.

TECHNICAL FIELD

The present invention relates to battery packs including a plurality of battery modules each including a plurality of batteries.

BACKGROUND ART

Battery packs including a plurality of batteries accommodated in a case to allow an output of a predetermined voltage and capacitance are widely used as power sources of various devices, vehicles, etc. Specifically, the technique of forming modules of battery assemblies obtained by connecting general-purpose batteries in parallel and/or in series to output a predetermined voltage and capacitance, and combining the battery modules together to be applicable to various applications is beginning to be used. This module forming technique can reduce the size and weight of the battery modules themselves by increasing the performance of batteries accommodated in the battery modules. Thus, this module forming technique has various advantages, an example of which is that workability can be improved in assembling a battery pack, and the flexibility in mounting the battery module in areas of limited space, such as a vehicle, can be increased.

However, the performance of the batteries included in each battery assembly is not necessarily uniform. Therefore, for example, during discharge, the current capacity of the battery assembly is limited by a battery having a minimum capacity, and during charge, recharging the whole battery assembly is limited by the battery having the minimum capacity. Thus, when the battery assembly is charged and discharged beyond such limits, problems such as a reduction in cycle life of the battery assembly may arise due to deterioration of the battery having the minimum capacity.

As a method to solve such problems, Patent Document 1 describes that in a battery assembly including a plurality of batteries connected to each other in parallel and/or in series, adjacent batteries are connected to each other in a complex manner to configure a network. When such a network is configured, batteries having non-uniform properties are automatically equilibrated, so that it is possible to reduce performance degradation of a certain battery, as a result of which the cycle life of the battery assembly can be extended.

CITATION LIST

Patent Document

PATENT DOCUMENT 1: Japanese Translation of PCT International Application No. 2002-533042

SUMMARY OF THE INVENTION

Technical Problem

As described above, forming modules of battery assemblies and accordingly combining these battery modules with each other to fit into a limited space in, for example, a vehicle allow flexible mounting of a battery pack capable of outputting a predetermined voltage and capacitance.

For example, when a battery module is formed by two-dimensionally aligning cylindrical batteries, the external size of the battery module depends on the number of rows and columns of the two-dimensionally aligned cylindrical batteries. With reference to the external size, the number of battery modules to be aligned and the disposition orientation (vertical disposition or horizontal disposition) of the battery modules are varied so that a battery pack in which the plurality of battery modules are combined with each other fits to the size of a limited space and can be mounted in the limited space.

However, the external size of the battery module is limited by the height of the cylindrical batteries, and the number of rows and columns of the two-dimensionally aligned cylindrical batteries. Thus, there is the case where the battery pack cannot be mounted in a narrow space even when the number of the battery modules to be aligned, or the disposition orientation of the battery modules are varied. It cannot be said that the flexibility in mounting the battery modules in a limited space is necessarily sufficient.

In view of the above-described points, the present invention has been devised. It is a primary objective of the present invention to provide a battery pack including a plurality of battery modules, wherein the flexibility in mounting the battery modules in a limited space is improved.

Solution to the Problem

In the present invention, a battery assembly including a plurality of cells aligned in a row is used as a unit, a first battery module in which multiple ones of the battery assembly are aligned in parallel and a second battery module in which multiple ones of the battery assembly are aligned in series are prepared, and these two types of battery modules are combined with each other to form a battery pack.

The minimum width of the external size of the second battery module including the plurality of battery assemblies aligned in series matches the minimum width of the cells included in the battery assemblies. By contrast, the minimum width of the external size of the first battery module including the plurality of battery assemblies aligned in parallel varies depending on the number of the battery assemblies aligned in parallel, but the minimum width is at least the product of the minimum width of the cells and the number of the battery assemblies. Therefore, it is possible to widen the difference between the minimum widths of the external sizes of the first battery module and the second battery module. Thus, mounting the first battery module in a wide space, and the second battery module in a narrow space can increase the flexibility in mounting the battery pack in a limited space. Moreover, the first battery module and the second battery module are both formed by using a battery assembly including a plurality of cells aligned in a row as a unit, so that it is possible to easily form the battery modules.

That is, a battery pack according to the present invention includes: a plurality of battery modules each including a plurality of cells aligned and accommodated in a case, wherein a battery assembly including a plurality of cells aligned in a row is used as a unit, and each battery module is formed by aligning multiple ones of the battery assembly, the battery modules include a first battery module in which the battery assemblies are aligned in parallel, and a second battery module in which the battery assemblies are aligned in series, and the first battery module and the second battery module are combined with each other to form the battery pack.

Here, it is preferable in the battery pack that the plurality of cells aligned in a row be electrically connected to each other in parallel. With this configuration, in the battery pack which is formed by combining the first battery module and the second battery module which are formed by using the battery assembly as a unit, current supply from the battery pack can be ensured even in case of a failure of one cell included in the battery assembly.

Moreover, each battery assembly preferably includes an electrode terminal as a positive electrode, and an electrode terminal as a negative electrode, and a signal terminal via which a signal for controlling charge and discharge of the cells is input and output. With this configuration, battery modules including battery assemblies are easily electrically connected to each other, and charge and discharge of the battery modules are easily controlled.

Moreover, each cell has an opening portion (safety valve) through which gas generated in the cell is exhausted to the outside of the cell, and each battery assembly further includes an exhaust duct in communication with the opening portion of each cell. With this configuration, even when heat is abnormally generated in one of the cells included in the battery assembly, and a safety valve is activated to exhaust high-temperature gas to the outside of the cell, the high-temperature gas is not exposed to the cells in the periphery of the cell from which the gas is exhausted, and the high-temperature gas can be exhausted to the outside of the battery assembly via the exhaust duct. As a result, even in case of a failure of one of the cells included in the battery assembly, the failure does not influence other normal cells, so that it is possible to form a highly safe battery module.

Advantages of the Invention

According to the present invention, a battery pack includes two types of battery modules having different minimum widths of external sizes, and the two types of the battery modules are formed by using a battery assembly including a plurality of cells aligned in a row as a unit, so that it is possible to easily form a battery pack having high flexibility in mounting in a limited space.

BRIEF DESCRIPTION OF THE DRAWINGS

FIG. 2 is an exploded perspective view schematically illustrating a configuration of a battery assembly of the embodiment of the present invention.

FIG. 3A is a perspective view of the battery assembly of the embodiment of the present invention. FIG. 3B is a cross-sectional view of the battery assembly. FIG. 3C is an enlarged view of part A of FIG. 3B.

FIGS. 4A-4E are exploded perspective views schematically illustrating a configuration of a first battery module of the embodiment of the present invention.

FIGS. 8A-8D are exploded perspective views schematically illustrating a configuration of a second battery module of another embodiment.

FIGS. 11A, 11B are perspective views illustrating an example combination of the first battery module and the second battery module.

DESCRIPTION OF EMBODIMENTS

Embodiments of the present invention will be described in detail below with reference to the drawings. The present invention is not limited to the following embodiments. The embodiment can be modified without deviating from the effective scope of the present invention. The embodiment can be combined with other embodiments.

Figure 1:
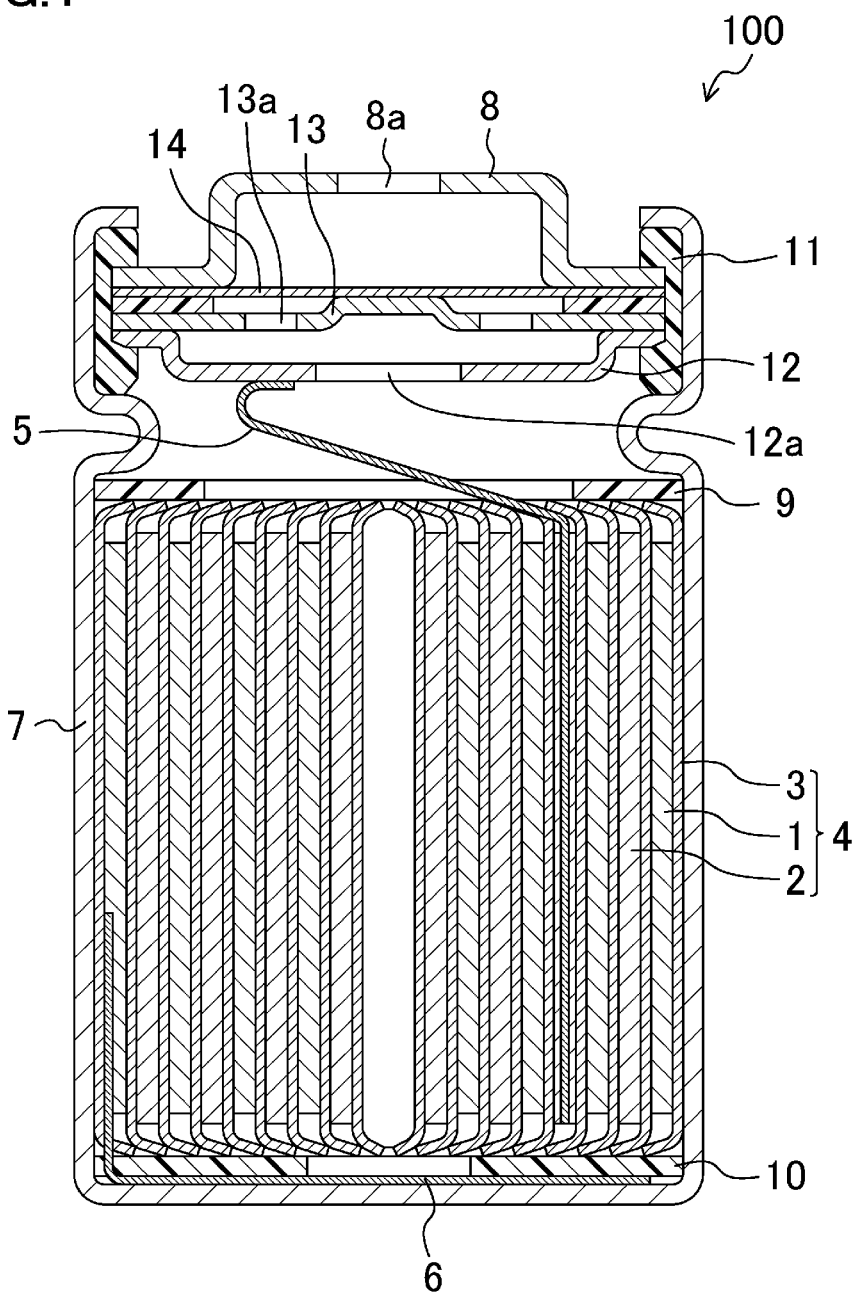
FIG. 1 is a cross-sectional view schematically illustrating a configuration of a cell used for a battery module of an embodiment of the present invention.

FIG. 1 is a cross-sectional view schematically illustrating a configuration of a battery (hereinafter referred to as a "cell") 100 used for a battery module of an embodiment of the present invention. Note that a battery pack of the present invention is configured as a set of battery modules, wherein a battery assembly in which multiple ones of the cell 100 are aligned in a row is used as a unit, and each battery module is formed by aligning multiple ones of the battery assembly.

The cell 100 included in the battery assembly of the present invention can be, for example, a cylindrical lithium ion secondary battery as illustrated in FIG. 1. The lithium ion secondary battery may be a general-purpose battery used as a power source of portable electronic devices such as laptop computers. In this case, a high-performance general-purpose battery can be used as a cell of a battery module, and thus the performance of the battery module can be easily increased, and the cost of the battery module can be easily reduced. Moreover, the cell 100 includes a safety mechanism to release gas to the outside of the cell when the pressure in the cell increases due to the occurrence of, for example, an internal short circuit. A specific configuration of the cell 100 will be described below with reference to FIG. 1.

As illustrated in FIG. 1, an electrode group 4 formed by winding a positive electrode 1 and a negative electrode 2 with a separator 3 interposed between the positive electrode 1 and the negative electrode 2 is accommodated in a battery case 7 with a nonaqueous electrolyte. Insulating plates 9, 10 are provided above and under the electrode group 4, respectively. The positive electrode 1 is connected to a filter 12 via a positive electrode lead 5. The negative electrode 2 is connected to a bottom section of the battery case 7 via a negative electrode lead 6, where the bottom section of the battery case 7 also serves as a negative electrode terminal.

The filter 12 is connected to an inner cap 13. A protruding section of the inner cap 13 is connected to a valve 14 made of metal. Moreover, the valve 14 is connected to a terminal board 8 (an electrode section of the positive electrode) also serving as a positive electrode terminal. The terminal board 8, the valve 14, the inner cap 13, and the filter 12 altogether seal an opening of the battery case 7 via a gasket 11.

When an internal short circuit, or the like occurs in the cell 100, and the pressure in the cell 100 increases, the valve 14 expands to the terminal board 8, and when the connection between the inner cap 13 and the valve 14 is released, a current path is shutdown. When the pressure in the cell 100 further increases, the valve 14 breaks. Thus, gas generated in the cell 100 is exhausted to the outside via a through hole 12a of the filter 12, a through hole 13a of the inner cap 13, a gap of the valve 14, and an opening portion 8a of the terminal board 8.

Note that a safety mechanism to exhaust gas generated in the cell 100 to the outside may be, but limited to, the structure illustrated in FIG. 1.

FIG. 2 is an exploded perspective view schematically illustrating a configuration of a battery assembly 200 of the present embodiment. FIG. 3A is a perspective view of the battery assembly 200. FIG. 3B is a cross-sectional view of the battery assembly 200. FIG. 3C is an enlarged view of part A of FIG. 3B.

As illustrated in FIG. 2, the plurality of cells (cylindrical batteries) (in the figure, six cells) 100 are aligned in a row, and are accommodated in a case 30 to form the battery assembly 200 as illustrated in FIG. 3A. Here, the positive electrode terminals 8 of the cells 100 are aligned in a same direction, and the plurality of cells 100 aligned in a row are electrically connected to each other in parallel. With this configuration, in the battery pack formed by combining the battery modules in each of which the battery assembly 200 is used as a unit, current supply from the battery pack can be ensured even in case of a failure of one of the cells 100 included in the battery assembly 200.

Specifically, as illustrated in FIG. 2, a positive electrode connection plate 21 and a negative electrode connection plate 22 are formed on a surface of a flat plate 20. As illustrated in FIG. 3C, the positive electrode connection plate 21 is connected to the positive electrode terminals 8 of the cells 100 via openings 20a formed in the flat plate 20. Moreover, the negative electrode terminals (the bottom sections of the battery cases 7) of the cells 100 are connected to each other via a negative electrode bus bar 23, and are connected to the negative electrode connection plates 22, 22b formed on the flat plate 20 via conduction sections 24, 24a extending from a part of the negative electrode bus bar 23. With this configuration, the cells 100 are electrically connected to each other in parallel via the positive electrode connection plate 21 and the negative electrode connection plate 22 formed on the flat plate 20.

Moreover, as illustrated in FIG. 3C, the flat plate 20 is placed in close contact with an end section of each cell 100 (in the present embodiment, at a side close to the positive electrode terminal 8). As illustrated in FIG. 3B, the opening portions 8a of the cells 100 are in communication with an exhaust duct 50 provided in a space between the flat plate 20 and a lid 40 via openings 21b of the positive electrode connection plate 21. With this configuration, high-temperature gas exhausted via the opening portion 8a of the cell 100 is exhausted to the exhaust duct 50 via the opening 20a formed in the flat plate 20. Moreover, the exhaust duct 50 is partitioned in a substantially sealed state with respect to the plurality of cells 100. Thus, the high-temperature gas exhausted to the exhaust duct 50 is not exposed to the cells 100 in the periphery of the cell 100 which exhausts the high-temperature gas, and can be released via the exhaust duct 50 to the outside of the battery assembly 200 from an outlet 40a formed in the lid 40.

Moreover, as illustrated in FIG. 3A, an end section of the flat plate 20 protrudes from the outlet 40a of the lid 40 to the outside, and an electrode terminal 21a as a positive electrode and an electrode terminal 22a as a negative electrode are exposed to the outside, where the electrode terminal 21a is provided at an end section of the positive electrode connection plate 21, and the electrode terminal 22a is provided at an end section of the negative electrode connection plate 22. With this configuration, the battery assemblies 200 can be easily electrically connected to each other. Note that the flat plate 20 may be a circuit board on which the electrode terminals 21a, 22a as the positive electrode and the negative electrode, and a signal terminal (not shown) via which a signal for controlling charge and discharge of the cells 100 is input and output are formed.

Here, in the battery assembly 200 of the present invention, the plurality of cells 100 may be aligned in a row, but the direction of the positive electrode terminals 8 of the cells 100 and the electrical relationship of the connection between the cells 100 are not particularly limited. For example, the cells 100 adjacent to each other may be aligned so that their positive electrode terminals 8 are alternately in different directions, and the cells 100 aligned in a row may be electrically connected to each other in series. Alternatively, the electrode terminals 21a, 22a as the positive electrode and the negative electrode, and the signal terminal via which the signal for controlling charge and discharge of the cells 100 is input and output are not necessarily incorporated into the battery assembly 200.

Alternatively, the battery assembly 200 may not be necessarily accommodated in the case 30. In this case, the battery assembly 200 is not provided with the exhaust duct 50, but as described later, a battery module including a plurality of battery assemblies 200 is accommodated in a case, so that an exhaust duct can be formed for the battery module.

The battery pack of the present invention is configured as a set of the plurality of battery modules, wherein the battery assembly 200 including the plurality of cells 100 aligned in a row is used as a unit, and each battery module is formed by aligning the plurality of battery assemblies 200. The battery modules included in the battery pack include two types of battery modules, that is, a first battery module including the plurality of battery assemblies 200 aligned in parallel, and a second battery module including the plurality of battery assemblies 200 aligned in series. The first battery module is combined with the second battery module to form the battery pack.

Figure 5:
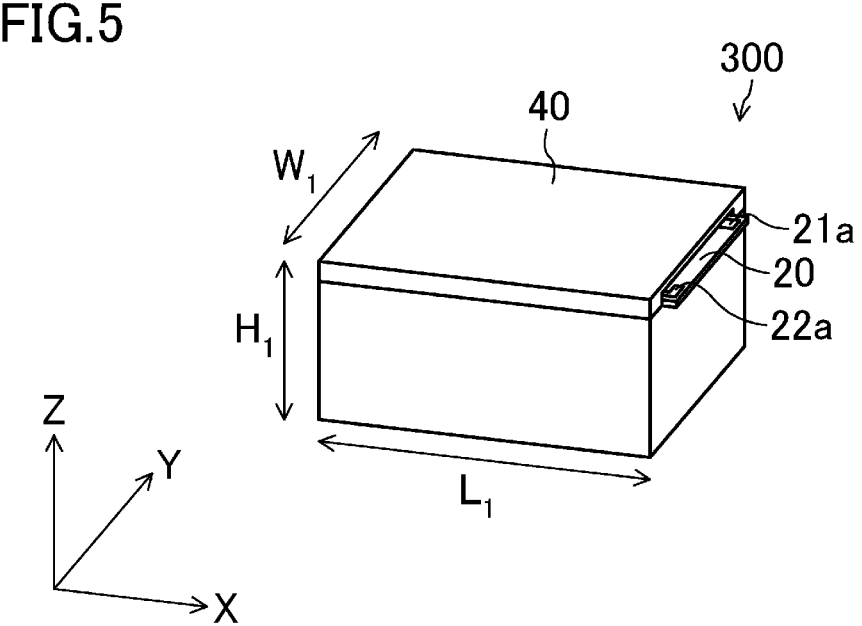
FIG. 5 is a perspective view of the first battery module of the embodiment of the present invention.

FIGS. 4A-4E are exploded perspective views schematically illustrating a configuration of a first battery module 300 of the present embodiment. FIG. 5 is a perspective view of the first battery module 300.

As illustrated in FIG. 4C, the plurality of battery assemblies (in the figure, four battery assemblies) 200 are aligned in parallel to form the first battery module 300, where each battery assembly 200 includes a plurality of cells (in the figure, six cells) aligned in a row. Here, "aligned in parallel" means that the plurality of battery assemblies 200 are aligned in Y direction perpendicular to X direction (row direction) in which the plurality of cells are aligned in a row.

In the first battery module 300, the positive electrodes and the negative electrodes of the battery assemblies 200 aligned in parallel are electrically connected to each other in series. Specifically, the electrode terminals 21a as a positive electrode of the battery assemblies 200 and the electrode terminals 22a as a negative electrode of the battery assemblies 200 are electrically connected to each other in series, where the electrode terminals 21a and the electrode terminals 22a are formed on the surface of the flat plate 20. Note that the negative electrode terminals (the bottom sections of the battery cases) of the cells 100 aligned in X direction are connected to each other via the negative electrode bus bar 23, and are connected to the negative electrode connection plate 22 formed on the flat plate 20 via the conduction section 24 extending from a part of the negative electrode bus bar 23.

Here, instead of providing the flat plate 20 to each battery assembly 200 as illustrated in FIG. 2, one flat plate 20 may be provided to the whole first battery module 300. Alternatively, instead of accommodating each battery assembly 200 in the case 30, the whole first battery module 300 may be accommodated in one case 30, and may be covered with a lid 40. Alternatively, as illustrated in FIG. 5, an end section of the flat plate 20 may protrude from the outlet of the lid 40 to the outside, and the electrode terminals 21a, 22a as a positive electrode and a negative electrode of the first battery module 300 may be exposed to the outside. With this configuration, multiple ones of the first battery module 300 may be easily electrically connected to each other, or the first battery module 300 may be easily electrically connected to a second battery module which will be described later.

FIG. 6A-6E are exploded perspective views schematically illustrating a configuration of a second battery module 400A of the present embodiment. FIG. 7 is a perspective view of the second battery module 400A.

Figure 6:
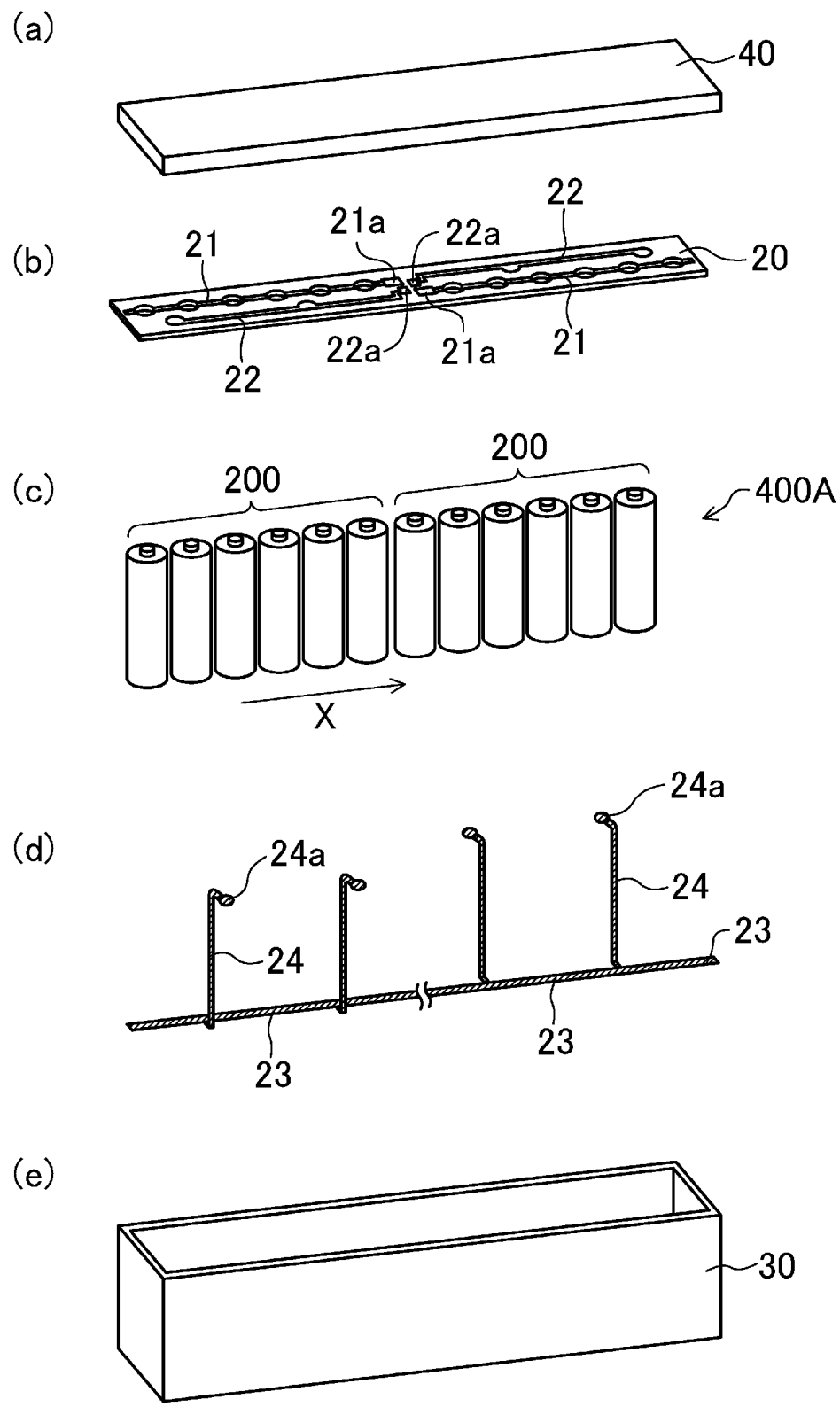
FIGS. 6A-6E are exploded perspective views schematically illustrating a configuration of a second battery module of an embodiment of the present invention.
Figure 7:
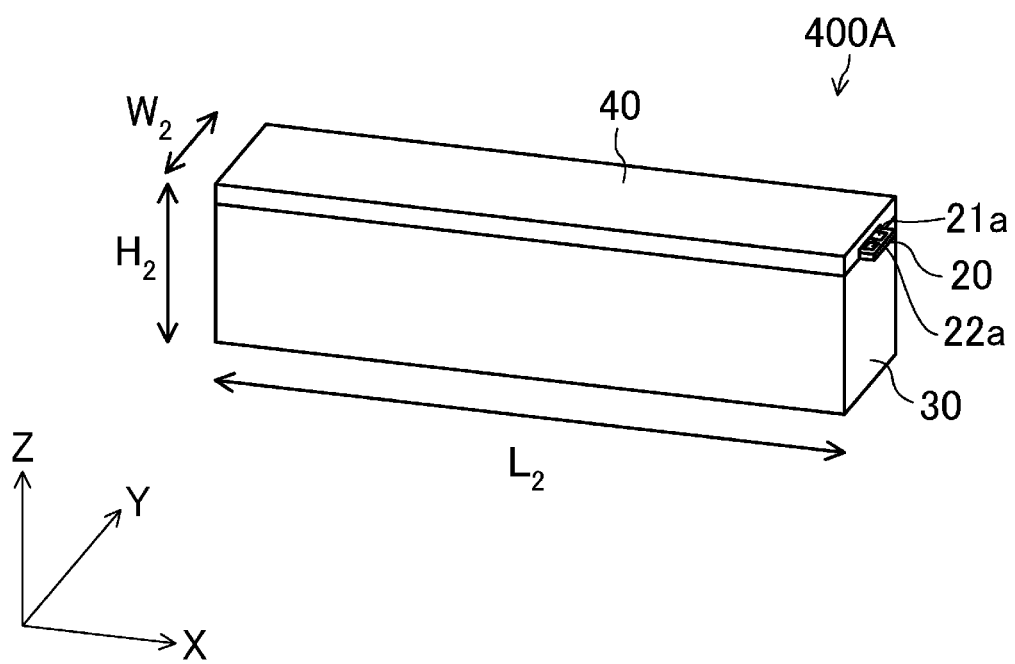
FIG. 7 is a perspective view of the second battery module of the embodiment of the present invention.

As illustrated in FIG. 6C, the plurality of battery assemblies (in the figure, two battery assemblies) 200 each including a plurality of cells (in the figure, six cells) aligned in a row are aligned in series to form a second battery module 400A. Here, "aligned in series" means that the plurality of battery assemblies 200 are aligned in a direction parallel to X direction (row direction) in which the plurality of cells are aligned in a row.

In the second battery module 400A, the positive electrodes and the negative electrodes of the battery assemblies 200 aligned in series are electrically connected to each other in series. Specifically, the positive electrode connection plates 21 and the negative electrode connection plates 22 of the battery assemblies 200 are electrically connected to each other in series via the electrode terminals 21a, 22a as a positive electrode and a negative electrode, where the positive electrode connection plates 21 and the negative electrode connection plates 22 are formed on the surface of the flat plate 20. Moreover, the negative electrode terminals (the bottom sections of the battery cases 7) of the cells 100 of each battery assembly 200 are connected to each other via the negative electrode bus bar 23, and are connected to the negative electrode connection plate 22 formed on the flat plate 20 via the conduction sections 24, 24a extending from a part of the negative electrode bus bar 23.

Here, instead of providing the flat plate 20 to each battery assembly 200 as illustrated in FIG. 2, one flat plate 20 may be provided to the whole second battery module 400A. Alternatively, instead of accommodating each battery assembly 200 in the case 30, the whole second battery module 400A may be accommodated in one case 30, and may be covered with a lid 40. Alternatively, as illustrated in FIG. 7, an end section of the flat plate 20 may protrude from the outlet of the lid 40 to the outside, and the electrode terminals 21a, 22a as a positive electrode and a negative electrode the whole second battery module 400A may be exposed to the outside. With this configuration, multiple ones of the second battery module 400A may be easily electrically connected to each other, or the second battery module 400A may be easily electrically connected to the first battery module 300.

Figure 9:
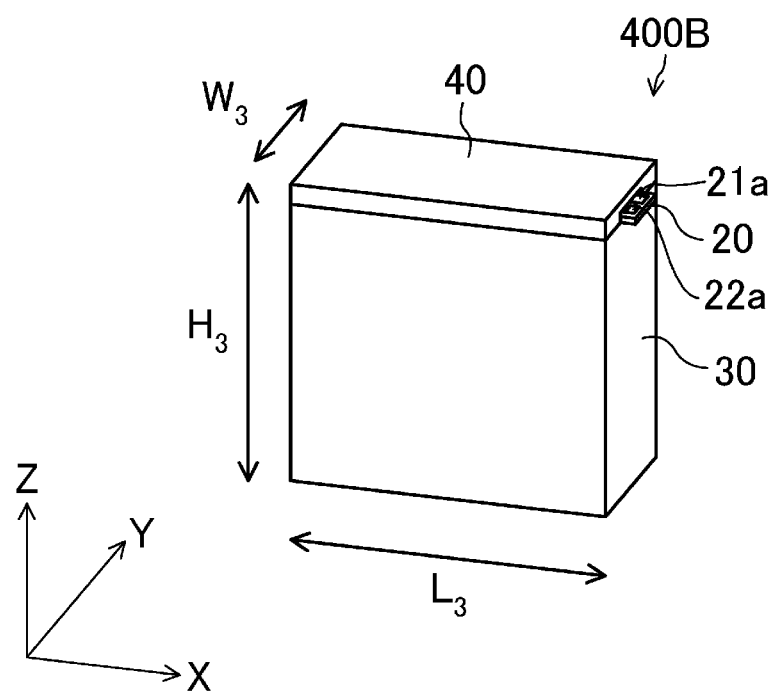
FIG. 9 is a perspective view of the second battery module of the another embodiment.

FIG. 8A-8D are exploded perspective views schematically illustrating a configuration of a second battery module of another embodiment. FIG. 9 is a perspective view of a second battery module 400B of another embodiment.

In the present invention, the plurality of battery assemblies 200 are aligned in series to form the second battery module, where "aligned in series" means, in addition to an alignment in which the plurality of battery assemblies 200 are aligned in a direction parallel to X direction (row direction) in which the plurality of cells are aligned in a row as illustrated in FIG. 6A-6E, an alignment in which the plurality of battery assemblies (in the figure, two battery assemblies) 200 are aligned in an axial direction (Z direction) of the cells (cylindrical batteries) 100 as illustrated in FIGS. 8A-8D. Specifically, the positive electrode connection plates 21 and the negative electrode connection plates 22 of the battery assemblies 200 are electrically connected to each other in series, where the positive electrode connection plates 21 and the negative electrode connection plates 22 are formed on the surface of the flat plate 20.

Here, instead of accommodating each battery assembly 200 in the case 30, the whole second battery module 400B may be accommodated in one case 30 as illustrated in FIG. 9, and may be covered with a lid 40. Alternatively, an end section of the flat plate 20 may protrude from an outlet of the lid 40 to the outside, and electrode terminals 21a, 22a as a positive electrode and a negative electrode of the whole second battery module 400B may be exposed to the outside. With this configuration, multiple ones of the second battery module 400B may be easily electrically connected to each other, or the second battery module 400B may be easily electrically connected to the first battery module 300 or the second battery module 400A.

Here, as illustrated in FIG. 5, the length L1, the height H1, and the width W1 of the external size of the first battery module 300 including the plurality of the battery assemblies 200 aligned in parallel depend on the product of the diameter of the cell (cylindrical battery) and the number of the cells aligned in a row in the battery assembly 200, on the height of the cell in an axial direction, and on the product of the diameter of the cell and the number of the battery assemblies 200 aligned in parallel in the first battery module 300, respectively.

Moreover, as illustrated in FIG. 7, the length L2, the height H2, and the width W2 of the external size of the second battery module 400A including the plurality of battery assemblies 200 aligned in series depend on the product of the diameter of the cell (cylindrical battery), the number of the cells aligned in a row in the battery assembly 200, and the number of the battery assemblies 200 aligned in series in the second battery module 400A, on the height of the cell in an axial direction, and on the diameter of the cell, respectively.

Moreover, as illustrated in 9, the length L3, the height H3, and the width W3 of the external size of the second battery module 400B including the plurality of battery assemblies 200 aligned in series depend on the product of the diameter of the cell (cylindrical battery) and the number of the cells aligned in a row in the battery assembly 200, on the product of the height of the cell in an axial direction, and the number of the battery assemblies 200 aligned in series in the second battery module 400B, and on the diameter of the cell, respectively.

That is, the minimum widths W2, W3 of the external sizes of the second battery modules 400A, 400B including the plurality of battery assemblies 200 aligned in series match the minimum width (diameter of the cylindrical battery) of the cell (cylindrical battery) included in the battery assembly 200. By contrast, the minimum width W1 of the external size of the first battery module 300 including the plurality of battery assemblies 200 aligned in parallel varies depending on the number of battery assemblies 200 aligned in parallel, where the minimum width W1 is at least the product of the minimum width of the cell and the number of battery assemblies 200. Therefore, it is possible to widen the difference between the minimum width of the external size of the first battery module 300 and the minimum widths of the external sizes of the second battery modules 400A, 400B. Thus, when the first battery module 300 is mounted in a wide space, and the second battery modules 400A, 400B are mounted in a narrow space, it is possible to increase the flexibility in mounting the battery pack in a limited space. Moreover, in forming the first battery module 300 and the second battery modules 400A, 400B, the battery assembly 200 including a plurality of cells aligned in a row is used as a unit, and thus the battery modules can be easily formed.

Figure 10:
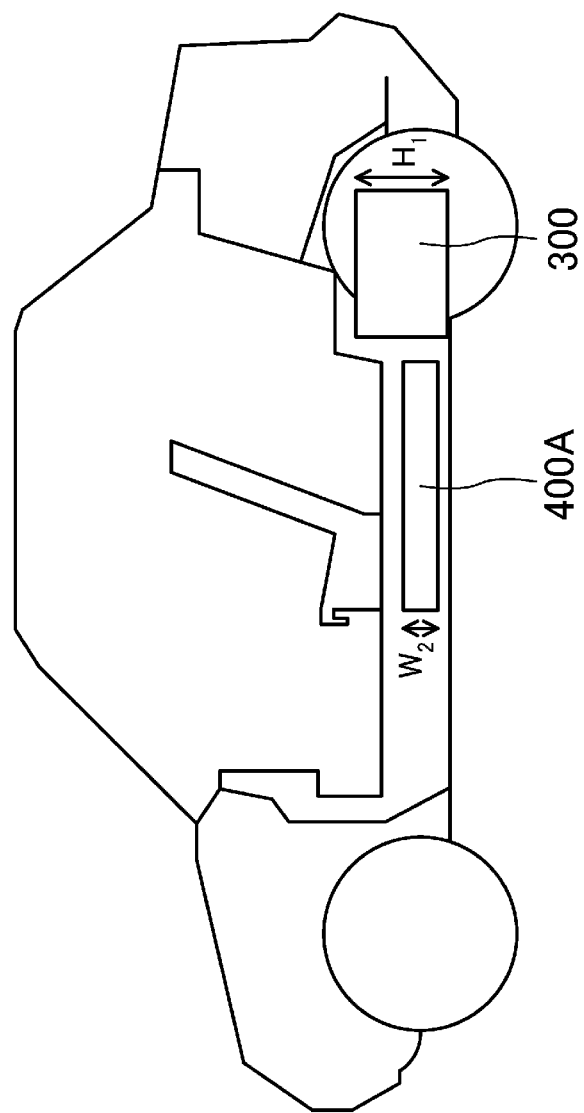
FIG. 10 is a view illustrating an example in which a battery pack including a plurality of battery modules is mounted on a vehicle.

FIG. 10 is a view schematically illustrating an example in which a battery pack including a plurality of battery modules is mounted on a vehicle. In a relatively wide space under a rear seat, the first battery module 300 is disposed with the H1 being in a vertical direction, and in a narrow space under a floor between a front seat and the rear seat, the second battery module 400A is disposed with the minimum width W2 being in the vertical direction, so that the battery modules can be efficiently disposed in the limited space.

Note that to allow an output of a predetermined voltage and capacitance, the battery pack of the present invention may be formed by accordingly combining two types of battery modules having different external sizes (the first battery module 300 and the second battery modules 400A, 400B), and the number of the battery modules 300, 400A, 400B, and how the battery modules 300, 400A, 400B are aligned may be accordingly selected depending on the size of a space in which the battery pack is mounted.

FIGS. 11A, 11B are perspective views illustrating an example combination of the first battery modules 300 and the second battery modules 400B. In FIG. 11A, the plurality of first battery modules (in the figure, eight first battery modules) 300 are arranged in parallel in a relatively wide space, and the second battery modules 400B are arranged in parallel and in series (in the figure, three by three second battery modules 400B are arranged) in a narrow space. Note that some of the second battery modules 400B may be stacked in two layers if there is enough space.

Alternatively, as illustrated in FIG. 11B, in addition to arranging the second battery modules 400B in the narrow space, the plurality of first battery modules (in the figure, eight first battery modules) 300 may be arranged in parallel in a relatively wide space, and in the remaining space, the plurality of second battery modules (in the figure, three second battery modules) 400B may be arranged.

Here, as illustrated in FIGS. 11A, 11B, in the battery pack in which the first battery modules 300 are combined with the second battery modules 400B, the axial direction of the cells in the battery assemblies 200 included in the first battery modules 300 is orthogonal to the axial direction of the cells in the battery assemblies included in the second battery modules 400B.

Moreover, the number of battery assemblies 200 aligned in parallel in the first battery module 300 is not limited, and thus the number of battery assemblies 200 included in the first battery module 300 is greater than the number of battery assemblies 200 included in the second battery module 400B.

In the above description, the present invention has been described with reference to the preferable embodiments, but the description is not intended to limit the invention, and of course, various modifications can be made. For example, in the above embodiment, the example in which the battery assemblies 200 included in the first battery module 300, the second battery modules 400A, 400B are electrically connected to each other in series has been described, but the battery assemblies 200 may be electrically connected to each other in parallel. Although the cell 100 is a cylindrical battery in the embodiments, the cell 100 may be a rectangular battery. Alternatively, types of the cell are not particularly limited, and for example, a lithium-ion battery, a nickel-hydrogen battery, or the like may be used.

INDUSTRIAL APPLICABILITY

The present invention is useful as power sources for driving vehicles, electric motorcycles, electric play equipment, or the like.

DESCRIPTION OF REFERENCE CHARACTERS

1 Positive Electrode
2 Negative Electrode
3 Separator
4 Electrode Group
5 Positive Electrode Lead
6 Negative Electrode Lead
7 Battery Case
8 Terminal Board (Positive Electrode Terminal)
8a Opening Portion
9, 10 Insulating Plate
11 Gasket
12 Filter
12a Through Hole
13 Inner Cap
13a Through Hole
14 Valve
20 Flat Plate
20a Opening
21 Positive Electrode Connection Plate
21a, 22a Electrode Terminal
21b Opening
22 Negative Electrode Connection Plate
23 Negative Electrode Bus Bar
24 Conduction Section
30 Case
40 Lid
40a Outlet
50 Exhaust Duct
100 Cell
200 Battery Assembly
300 First Battery Module
400A, 400B Second Battery Module

The invention claimed is:

1. A battery pack comprising:
a plurality of battery modules each including a plurality of cells which are cylindrical batteries aligned and accommodated in a case, wherein
a battery assembly including a plurality of cells electrically connected to each other in parallel is used as a unit, and each battery module is formed by aligning multiple ones of the battery assembly,
the battery modules include:
a first battery module in which the battery assemblies are aligned such that an axial direction of the cells is a height direction of the first battery module, and
a second battery module in which the battery assemblies are aligned such that a direction perpendicular to the axial direction of the cells is a height direction of the second battery module,
the first battery module includes a plurality of first battery assemblies,
the second battery module includes a plurality of second battery assemblies,
a number of the cells in each first battery assembly is equal to a number of the cells in each second battery assembly, a length in the height direction of the second battery module is smaller than a length in the height direction of the first battery module, the first battery module and the second battery module are combined with each other to form the battery pack, each cell has an opening portion through which gas generated in the cell is exhausted to the outside, each battery assembly further includes an exhaust duct in communication with the opening portion of each cell, the exhaust duct includes a flat plate disposed at one side of the plurality of cells, and the opening portions of the cells are in communication with the exhaust duct via through holes formed in the flat plate.

2. The battery pack of claim 1, wherein
the opening portion of each cell is formed in an electrode terminal of the cell.

3. The battery pack of claim 1, wherein
each battery assembly includes
   an electrode terminal as a positive electrode, and an electrode terminal as a negative electrode, and
   a signal terminal via which a signal for controlling charge and discharge of the cells is input and output.

4. The battery pack of claim 3, wherein
in the first battery module, the electrode terminals as the positive electrodes and the negative electrodes of the battery assemblies are electrically connected to each other in series, and in the second battery module, the electrode terminals as the positive electrodes and the negative electrodes of the battery assemblies are electrically connected to each other in series.

5. The battery pack of claim 1, wherein
the flat plate is arranged in close contact with an end section of each cell, and
the exhaust duct is partitioned in a sealed state with respect to the plurality of cells.

6. The battery pack of claim 1, wherein
the flat plate is formed as a circuit board,
interconnects are formed on the circuit board, and
the interconnects are connected to electrode terminals as the positive electrodes and the negative electrodes, and a signal terminal of each battery assembly.

7. The battery pack of claim 1, wherein
the cells included in each battery assembly are arranged in a single row,
in the first battery module, the battery assemblies are aligned in a direction perpendicular to a row direction of the plurality of cells aligned in the single row, and
in the second battery module, the battery assemblies are aligned in a direction parallel to the row direction of the cells arranged in the single row or in a direction parallel to an axial direction of the cells which are the cylindrical batteries.

8. The battery pack of claim 7, wherein
the axial direction of the cells in the battery assemblies included in the first battery module is orthogonal to the axial direction of the cells in the battery assemblies in the second battery module.

9. The battery pack of claim 1, wherein
a number of the battery assemblies included in the first battery module is greater than a number of the battery assemblies included in the second battery module.

* * * * *